US012700353B2

(12) United States Patent
Kim et al.

(10) Patent No.: US 12,700,353 B2
(45) Date of Patent: Aug. 4, 2026

(54) DISPLAY DEVICE AND ELECTRONIC APPARATUS INCLUDING THE SAME

(71) Applicant: Samsung Display Co., Ltd., Yongin-si (KR)

(72) Inventors: Hong-Kyu Kim, Yongin-si (KR); Youngwoon Choi, Yongin-si (KR); Seyun Kim, Yongin-si (KR); Sungjae Park, Yongin-si (KR); Seungho Park, Yongin-si (KR); Namjae Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/212,527

(22) Filed: May 19, 2025

(65) Prior Publication Data

US 2026/0057824 A1 Feb. 26, 2026

(30) Foreign Application Priority Data

Aug. 26, 2024 (KR) ........................ 10-2024-0114226

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01); *G09G 2320/0233* (2013.01); *G09G 2320/0247* (2013.01); *G09G 2320/0257* (2013.01); *G09G 2330/021* (2013.01)

(58) Field of Classification Search
CPC ............. G09G 3/32; G09G 2310/0267; G09G 2310/08; G09G 2320/0233; G09G 2320/0247; G09G 2320/0257; G09G 2330/021
See application file for complete search history.

(56) References Cited

U.S. PATENT DOCUMENTS

| | | | | |
|---|---|---|---|---|
| 11,475,845 | B2 | 10/2022 | Kim et al. | |
| 2021/0056908 | A1* | 2/2021 | Park | G09G 3/3266 |
| 2022/0068194 | A1* | 3/2022 | Kim | G09G 3/32 |
| 2022/0335899 | A1* | 10/2022 | Park | G09G 3/3291 |
| 2024/0363059 | A1 | 10/2024 | Kim et al. | |

FOREIGN PATENT DOCUMENTS

| | | |
|---|---|---|
| CN | 114141191 | 3/2022 |
| KR | 10-2022-0030495 | 3/2022 |

* cited by examiner

*Primary Examiner* — Jonathan A Boyd

(74) *Attorney, Agent, or Firm* — Womble Bond Dickinson (US) LLP

(57) ABSTRACT

A display device includes: a display panel including a pixel; a scan driver configured to provide a first scan signal and a second scan signal to the pixel; and a controller configured to provide a first scan control signal for generating the first scan signal and a second scan control signal for generating the second scan signal to the scan driver, wherein the second scan signal includes an active pulse in an active period having a constant time length and at least one dummy pulse in a vertical blank period having a variable time length, and wherein an interval between the active pulse and a first dummy pulse of the second scan signal is different from an interval between the first dummy pulse and a second dummy pulse of the second scan signal.

20 Claims, 13 Drawing Sheets

DISPLAY DEVICE AND ELECTRONIC APPARATUS INCLUDING THE SAME

CROSS-REFERENCE TO RELATED APPLICATION

The present application claims priority to and the benefit of Korean Patent Application No. 10-2024-0114226, filed on Aug. 26, 2024, in the Korean Intellectual Property Office, the entire disclosure of which is incorporated herein by reference.

BACKGROUND

1. Field

Aspects of some embodiments of the present disclosure relate to a display device and an electronic apparatus including the same.

2. Description of the Related Art

A display device may include a display panel, a scan driver, and a controller. The display panel may include pixels for displaying an image. The scan driver may provide scan signals to the pixels. The controller may provide a scan control signal for generating the scan signals to the scan driver.

The display device may be driven in a variable refresh rate (VRR) mode in which a driving frequency of the display panel may change. When the display device displays a moving image, the driving frequency of the display panel may increase to relatively improve image quality of the display device. When the display device displays a still image, the driving frequency of the display panel may decrease to reduce power consumption of the display device.

The above information disclosed in this Background section is only for enhancement of understanding of the background and therefore the information discussed in this Background section does not necessarily constitute prior art.

SUMMARY

Aspects of some embodiments of the present disclosure relate to a display device and an electronic apparatus including the same. For example, aspects of some embodiments of the present disclosure relate to a display device driven by a variable refresh rate and an electronic apparatus including the display device.

Aspects of some embodiments include a display device with relatively improved display quality and an electronic apparatus including the display device.

A display device according to some embodiments includes a display panel including a pixel, a scan driver which provides a first scan signal and a second scan signal to the pixel, and a controller which provides a first scan control signal for generating the first scan signal and a second scan control signal for generating the second scan signal to the scan driver. According to some embodiments, the second scan signal includes an active pulse positioned in an active period having a constant time length and at least one dummy pulse positioned in a vertical blank period having a variable time length. According to some embodiments, an interval between the active pulse and a first dummy pulse of the second scan signal is different from an interval between the first dummy pulse and a second dummy pulse of the second scan signal.

According to some embodiments, the interval between the first dummy pulse and the second dummy pulse of the second scan signal may be equal to an interval between the second dummy pulse and a third dummy pulse of the second scan signal.

According to some embodiments, the interval between the active pulse and the first dummy pulse of the second scan signal may be greater than the interval between the first dummy pulse and the second dummy pulse of the second scan signal.

According to some embodiments, the interval between the first dummy pulse and the second dummy pulse of the second scan signal may be different from an interval between the second dummy pulse and a third dummy pulse of the second scan signal.

According to some embodiments, the interval between the active pulse and the first dummy pulse of the second scan signal may be greater than the interval between the first dummy pulse and the second dummy pulse of the second scan signal.

According to some embodiments, the interval between the first dummy pulse and the second dummy pulse of the second scan signal may be greater than the interval between the second dummy pulse and the third dummy pulse of the second scan signal.

According to some embodiments, the pixel may include a first transistor including a gate connected to a first node, a first terminal which receives a first power voltage, and a second terminal connected to a second node, a second transistor including a gate which receives the first scan signal, a first terminal which receives a data voltage, and a second terminal connected to the first node, a third transistor including a gate which receives the second scan signal, a first terminal which receives a reference voltage, and a second terminal connected to the second node, a capacitor including a first terminal connected to the first node and a second terminal connected to the second node, and a light-emitting diode including a first terminal connected to the second node and a second terminal which receives a second power voltage.

According to some embodiments, the capacitor may store a difference between the data voltage and the reference voltage in response to a pulse of the first scan signal and the active pulse of the second scan signal in the active period. The reference voltage may be applied to the second node in response to the at least one dummy pulse of the second scan signal in the vertical blank period.

According to some embodiments, a voltage level of the reference voltage may be lower than a voltage level of a threshold voltage of the light-emitting diode.

According to some embodiments, the first scan signal may include a pulse positioned in the active period, and has a deactivation level in the vertical blank period.

A display device according to some embodiments includes a display panel including a pixel, a scan driver which provides a first scan signal and a second scan signal to the pixel, and a controller which provides a first scan control signal for generating the first scan signal and a second scan control signal for generating the second scan signal to the scan driver. According to some embodiments, the second scan control signal includes an active pulse set including a plurality of consecutive pulses positioned in an active period having a constant time length and at least one dummy pulse set including a plurality of consecutive pulses positioned in a vertical blank period having a variable time length. According to some embodiments, an interval between the active pulse set and a first dummy pulse set of the second scan control signal is different from an interval between the first dummy pulse set and a second dummy pulse set of the second scan control signal.

According to some embodiments, the interval between the first dummy pulse set and the second dummy pulse set of the second scan control signal may be equal to an interval between the second dummy pulse set and a third dummy pulse set of the second scan control signal.

According to some embodiments, the interval between the active pulse set and the first dummy pulse set of the second scan control signal may be greater than the interval between the first dummy pulse set and the second dummy pulse set of the second scan control signal.

According to some embodiments, the interval between the first dummy pulse set and the second dummy pulse set of the second scan control signal may be different from an interval between the second dummy pulse set and a third dummy pulse set of the second scan control signal.

According to some embodiments, the interval between the active pulse set and the first dummy pulse set of the second scan control signal may be greater than the interval between the first dummy pulse set and the second dummy pulse set of the second scan control signal.

According to some embodiments, the interval between the first dummy pulse set and the second dummy pulse set of the second scan control signal may be greater than the interval between the second dummy pulse set and the third dummy pulse set of the second scan control signal.

According to some embodiments, the pixel may include a first transistor including a gate connected to a first node, a first terminal which receives a first power voltage, and a second terminal connected to a second node, a second transistor including a gate which receives the first scan signal, a first terminal which receives a data voltage, and a second terminal connected to the first node, a third transistor including a gate which receives the second scan signal, a first terminal which receives a reference voltage, and a second terminal connected to the second node, a capacitor including a first terminal connected to the first node and a second terminal connected to the second node, and a light-emitting diode including a first terminal connected to the second node and a second terminal which receives a second power voltage.

According to some embodiments, the first scan control signal may include a pulse set including a plurality of consecutive pulses positioned in the active period, and has a deactivation level in the vertical blank period.

An electronic apparatus according to some embodiments includes a display panel including a pixel, a scan driver which provides a first scan signal and a second scan signal to the pixel, a controller which provides a first scan control signal for generating the first scan signal and a second scan control signal for generating the second scan signal to the scan driver, and a processor which provides a control signal for generating the first scan control signal and the second scan control signal to the controller. According to some embodiments, the second scan signal includes an active pulse positioned in an active period having a constant time length and at least one dummy pulse positioned in a vertical blank period having a variable time length. According to some embodiments, an interval between the active pulse and a first dummy pulse of the second scan signal is different from an interval between the first dummy pulse and a second dummy pulse of the second scan signal.

According to some embodiments, the interval between the active pulse and the first dummy pulse of the second scan signal may be greater than the interval between the first dummy pulse and the second dummy pulse of the second scan signal.

In the display device and the electronic apparatus according to some embodiments, the interval between the active pulse and the first dummy pulse of the second scan signal is greater than the interval between the first dummy pulse and the second dummy pulse of the second scan signal, so that a maximum luminance deviation between frequencies may decrease, and accordingly, the image quality of the display device may be relatively improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
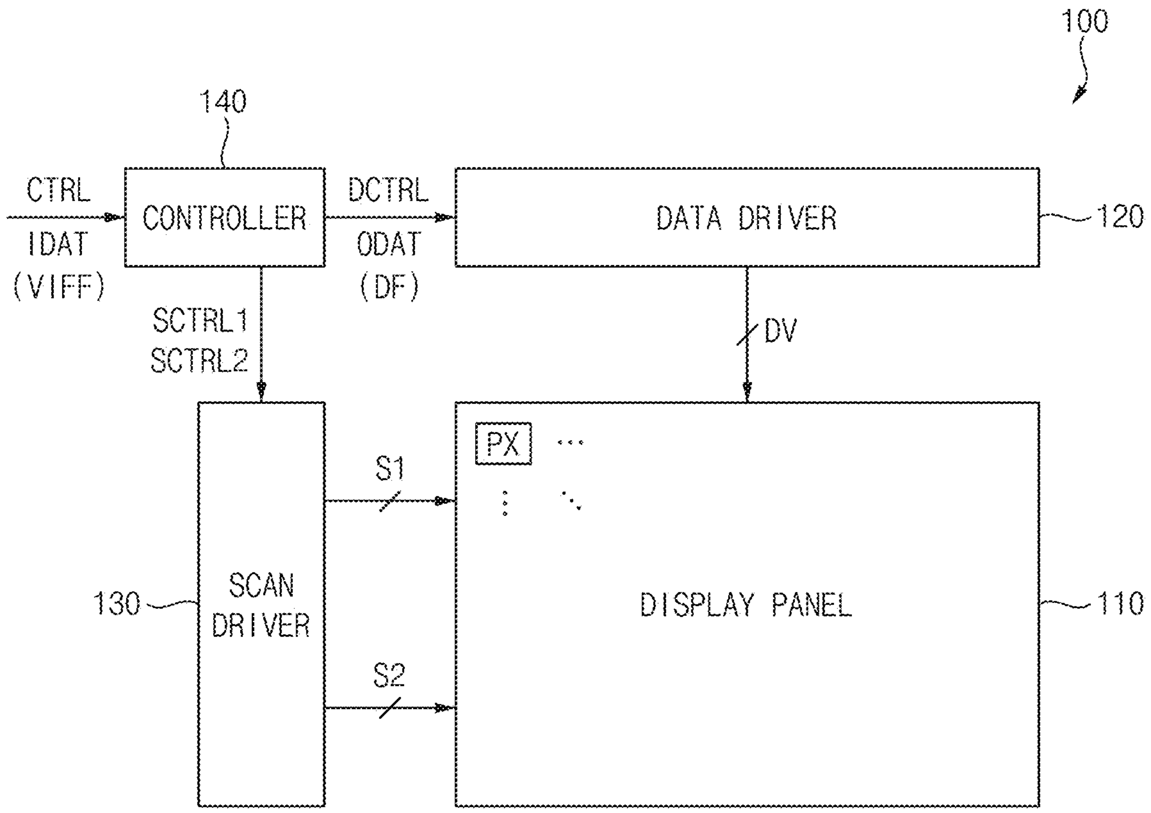
FIG. 1 is a block diagram showing a display device according to some embodiments.

Hereinafter, a display device and an electronic apparatus according to some embodiments of the present disclosure will be described in more detail with reference to the accompanying drawings. The same or similar reference numerals will be used for the same elements in the accompanying drawings.

FIG. 1 is a block diagram showing a display device 100 according to some embodiments.

Referring to FIG. 1, the display device 100 may include a display panel 110, a data driver 120, a scan driver 130, and a controller 140.

The display panel 110 may include a plurality of data lines, a plurality of first scan lines, a plurality of second scan lines, and a plurality of pixels PX. Although FIG. 1 illustrates a single pixel PX, as a person having ordinary skill in the art would appreciate, the display device 100 may include any suitable number of pixels PX according to the design and size of the display device 100. The data lines may provide data voltages DV to the pixels PX. The first scan lines may provide first scan signals S1 to the pixels PX. The second scan lines may provide second scan signals S2 to the pixels PX. The pixels PX may emit light in response to the data voltages DV, the first scan signals S1, and the second scan signals S2.

The display panel 110 may further include a plurality of reference voltage lines. The reference voltage lines may provide reference voltages to the pixels PX. According to some embodiments, the reference voltage lines may be used as sensing lines for sensing characteristics of the pixels PX.

The data driver 120 may provide the data voltages DV to the pixels PX through the data lines. The data driver 120 may generate the data voltages DV based on a data control signal DCTRL and output image data ODAT. According to some embodiments, the data control signal DCTRL may include an output data enable signal, a horizontal start signal, and a load signal. According to some embodiments, the data driver 120 may receive the output image data ODAT at a driving frequency DF that is variable within a range (e.g., a set or predetermined range).

According to some embodiments, the data driver 120 and the controller 140 may be implemented as a single integrated circuit, and such an integrated circuit may be called a timing controller embedded data driver (TED). According to some embodiments, the data driver 120 and the controller 140 may be implemented as separate integrated circuits.

The scan driver 130 may sequentially provide the first scan signals S1 to the pixels PX through the first scan lines on a pixel row basis, and may sequentially provide the second scan signals S2 to the pixels PX through the second scan lines on a pixel row basis. The scan driver 130 may generate the first scan signals S1 based on a first scan control signal SCTRL1, and may generate the second scan signals S2 based on a second scan control signal SCTRL2.

According to some embodiments, the scan driver 130 may be formed or mounted in a peripheral area of the display panel 110. According to some embodiments, the scan driver 130 may be implemented as at least one integrated circuit.

The controller 140 may control an operation (or driving) of the data driver 120 and an operation (or driving) of the scan driver 130. The controller 140 may provide the output image data ODAT and the data control signal DCTRL to the data driver 120, and may provide the first scan control signal SCTRL1 and the second scan control signal SCTRL2 to the scan driver 130. The controller 140 may generate the output image data ODAT, the data control signal DCTRL, the first scan control signal SCTRL1, and the second scan control signal SCTRL2 based on input image data IDAT and a control signal CTRL. According to some embodiments, the input image data IDAT may include red image data, green image data, and blue image data. According to some embodiments, the control signal CTRL may include a vertical synchronization signal, a horizontal synchronization signal, an input data enable signal, and a master clock signal. The controller 140 may receive the input image data IDAT and the control signal CTRL from an external host processor.

The host processor may change a time length of a vertical blank period for each frame period to provide the input image data IDAT to the controller 150 at a variable input frame frequency VIFF (or variable frame rate) that varies within a range (e.g., a set or predetermined range). The controller 150 may control the data driver 120 and the scan driver 130 to drive the display panel 110 at the driving frequency DF corresponding to the variable input frame frequency VIFF. In other words, the driving frequency DF of the display panel 110 may be determined as the variable input frame frequency VIFF. According to some embodiments, a mode of the display device 100 that drives the display panel 110 at the variable input frame frequency VIFF may be called a variable refresh rate (VRR) mode. The variable refresh rate mode may be a free-sync mode, a G-sync mode, etc., but is not limited thereto.

Figure 2:
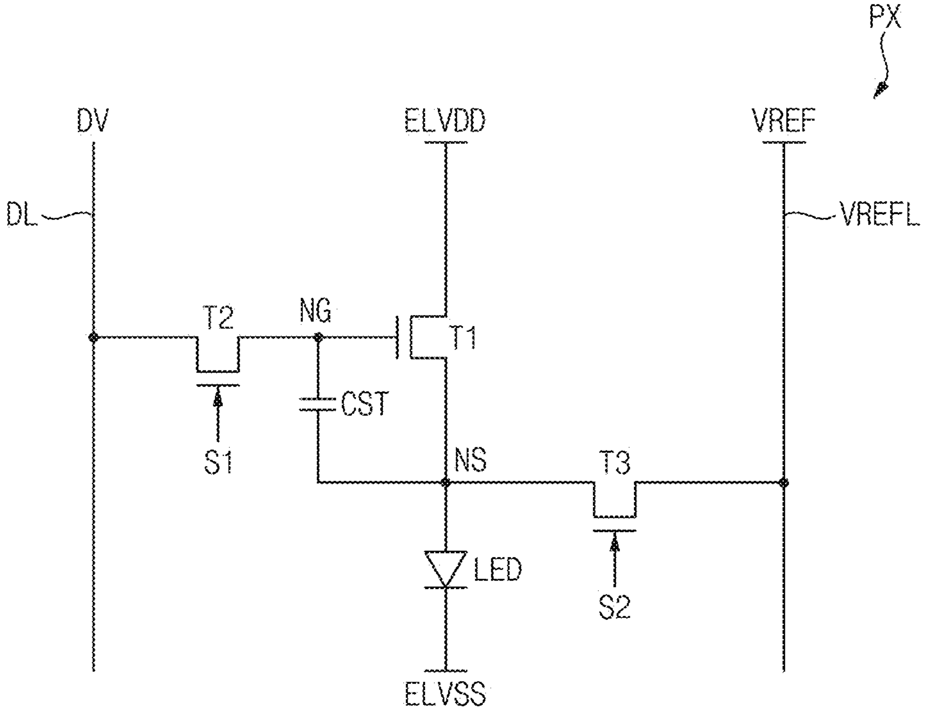
FIG. 2 is a circuit diagram showing a pixel of FIG. 1.

FIG. 2 is a circuit diagram showing aspects of the pixel PX of FIG. 1 according to some embodiments. Although FIG. 2 illustrates various components in a pixel PX according to some embodiments, embodiments according to the present disclosure are not limited thereto, and according to various embodiments, the pixel PX may include additional components or fewer components without departing from the spirit and scope of embodiments according to the present disclosure.

Referring to FIGS. 1 and 2, the pixel PX may include a first transistor T1, a second transistor T2, a third transistor T3, a capacitor CST, and a light-emitting diode LED. The pixel PX may receive a first scan signal S1, a second scan signal S2, a data voltage DV, a reference voltage VREF, a first power voltage ELVDD, and a second power voltage ELVSS. According to some embodiments, a voltage level of the first power voltage ELVDD may be higher than a voltage level of the second power voltage ELVSS. According to some embodiments, a voltage level of the reference voltage VREF may be lower than a voltage level of a threshold voltage of the light-emitting diode LED.

The first transistor T1 may generate a driving current corresponding to a voltage difference between a first node NG and a second node NS. The first transistor T1 may include a gate connected to the first node NG, a first terminal (e.g., a drain) that receives the first power voltage ELVDD, and a second terminal (e.g., a source) connected to the second node NS.

The second transistor T2 may transmit the data voltage DV to the first node NG in response to the first scan signal S1. The second transistor T2 may include a gate that receives the first scan signal S1, a first terminal (e.g., a drain) connected to a data line DL that transmits the data voltage DV, and a second terminal (e.g., a source) connected to the first node NG.

The third transistor T3 may transmit the reference voltage VREF to the second node NS in response to the second scan signal S2. The third transistor T3 may include a gate that receives the second scan signal S2, a first terminal (e.g., a drain) connected to a reference voltage line VREFL that transmits the reference voltage VREF, and a second terminal (e.g., a source) connected to the second node NS. According to some embodiments, the third transistor T3 may transmit a voltage of the second node NS that reflects characteristics of the first transistor T1 or characteristics of the light-emitting diode LED to the reference voltage line VREFL in response to the second scan signal S2.

According to some embodiments, each of the first transistor T1, the second transistor T2, and the third transistor T3 may be an NMOS transistor. According to some embodiments, at least one of the first transistor T1, the second transistor T2, and the third transistor T3 may be a PMOS transistor.

The capacitor CST may be connected between the first node NG and the second node NS. The capacitor CST may include a first terminal connected to the first node NG and a second terminal connected to the second node NS.

The light-emitting diode LED may include a first terminal (e.g., an anode) connected to the second node NS and a second terminal (e.g., a cathode) that receives the second power voltage ELVSS. The light-emitting diode LED may emit light with a luminance corresponding to the driving current generated by the first transistor T1.

Figure 3:
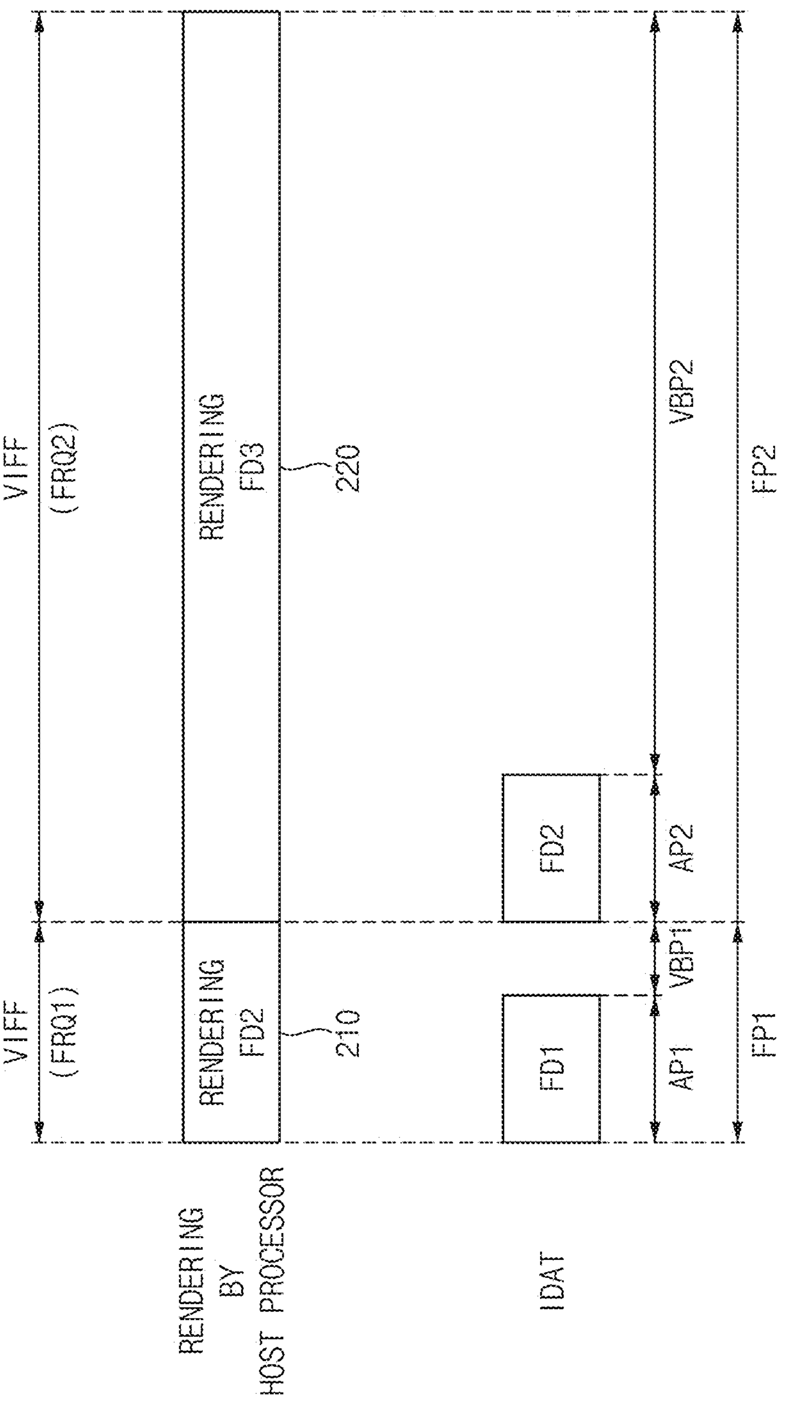
FIG. 3 is a diagram for describing a variable refresh rate mode of the display device of FIG. 1.

FIG. 3 is a diagram for describing the variable refresh rate mode of the display device 100 of FIG. 1.

Referring to FIGS. 1 and 3, a period or frequency of rendering 210 and 220 of the host processor may not be constant, and the host processor may provide the input image data IDAT (i.e., frame data FD1 and FD2) to the display device 100 in synchronization with the non-constant period or frequency of the rendering 210 and 220 in the variable refresh rate mode. In the variable refresh rate mode, each frame period FP1 and FP2 may have an active period AP1 and AP2 having a constant time length, and the host processor may provide the frame data FD1 and FD2 to the display device 100 with the variable input frame frequency VIFF by changing a time length of a vertical blank period VBP1 and VBP2 of each frame period FP1 and FP2.

As illustrated in FIG. 3, in the first frame period FP1, when the second frame data FD2 is rendered 210 at a first frequency FRQ1, the host processor may provide the first frame data FD1 to the display device 100 at the variable input frame frequency VIFF of the first frequency FRQ1. Further, the host processor may output the second frame data FD2 during the active period AP2 of the second frame period FP2, and may continue the vertical blank period VBP2 of the second frame period FP2 until the rendering 220 for the third frame data FD3 is completed. Accordingly, in the second frame period FP2, when the third frame data FD3 is rendered 220 at a second frequency FRQ2 lower than the first frequency FRQ1, the host processor may increase the time length of the vertical blank period VBP2 of the second frame period FP2 to provide the second frame data FD2 at the variable input frame frequency VIFF of the second frequency FRQ2 to the display device 100.

In the variable refresh rate mode, each frame period FP1 and FP2 may include the active period AP1 and AP2 having a constant time length regardless of the variable input frame frequency VIFF, and the vertical blank period VBP1 and VBP2 having a variable time length corresponding to the variable input frame frequency VIFF. For example, in the variable refresh rate mode, as the variable input frame frequency VIFF decreases, the time length of the vertical blank period VBP1 and VBP2 may increase. In the variable refresh rate mode, the controller 150 may output the input image data IDAT received at the variable input frame frequency VIFF as the output image data ODAT at the driving frequency DF substantially equal to the variable input frame frequency VIFF to the data driver 120. Accordingly, the display device 100 supporting the variable refresh rate mode may display an image in synchronization with the variable input frame frequency VIFF to prevent or reduce instances of a tearing phenomenon caused by frame frequency mismatch.

Figure 4:
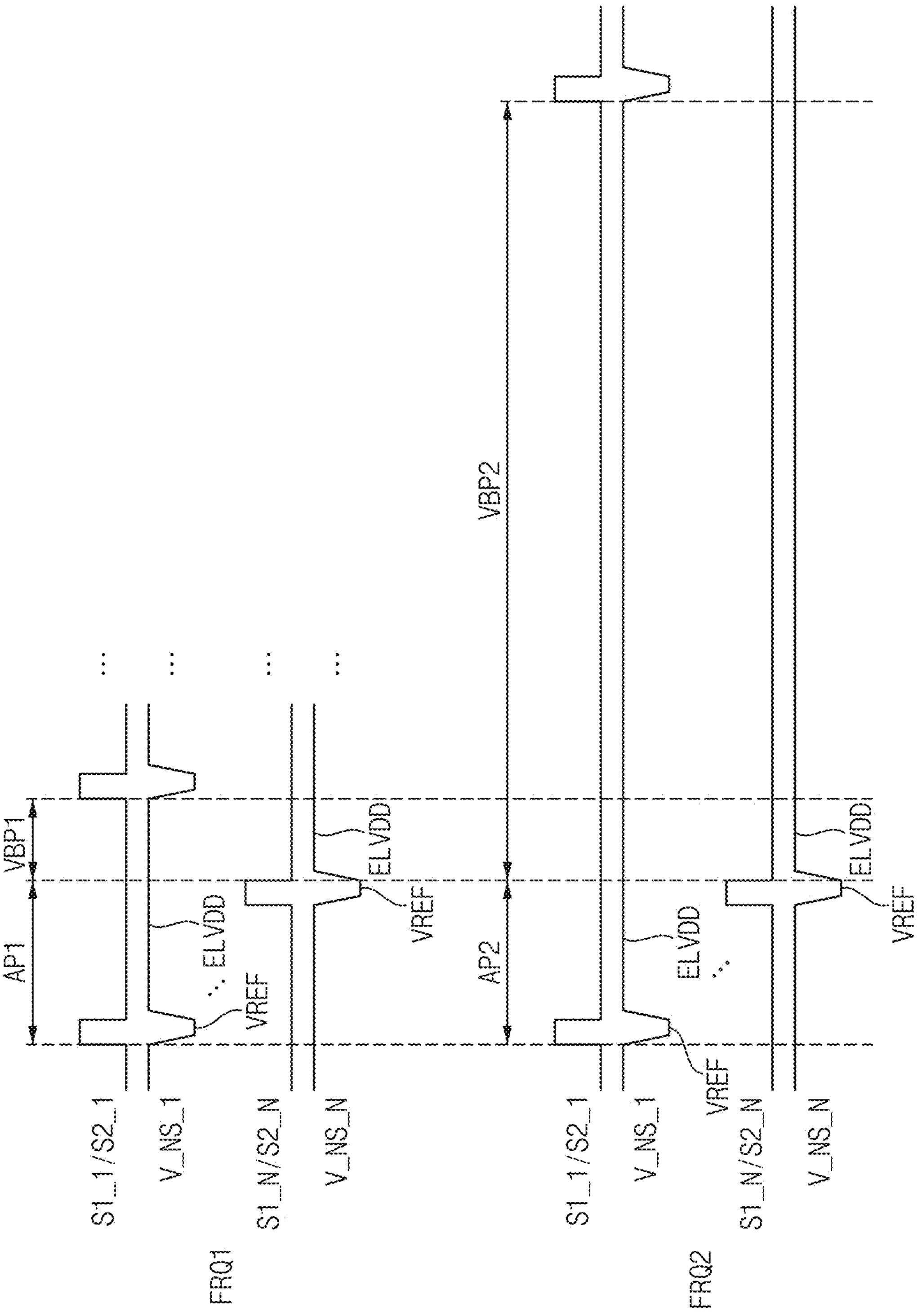
FIG. 4 is a timing diagram for describing an operation of a pixel at first and second frequencies according to a comparative example.

FIG. 4 is a timing diagram for describing an operation of a pixel PX at first and second frequencies FRQ1 and FRQ2 according to a comparative example.

Referring to FIGS. 2 and 4, the pixel PX may simultaneously receive pulses of the first and second scan signals S1 and S2 in each active period AP1 and AP2. When the pulses of the first and second scan signals S1 and S2 are applied to the pixel PX, the data voltage DV may be applied to the first node NG (i.e., the first terminal of the capacitor CST) and the reference voltage VREF may be applied to the second node NS (i.e., the second terminal of the capacitor CST). Accordingly, when the pulses of the first and second scan signals S1 and S2 are applied to the pixel PX, the capacitor CST may store a difference between the data voltage DV and the reference voltage VREF. When the pulses of the first and second scan signals S1 and S2 are applied to the pixel PX, the light-emitting diode LED may not emit light because the second node NS connected to the first terminal of the light-emitting diode LED has the reference voltage VREF.

The time length of the vertical blank period VBP1 and VBP2 may change depending on the driving frequency DF of the display panel 110. The time length of the vertical blank period VBP1 when the display panel 110 is driven at the first frequency FRQ1 may be different from the time length of the vertical blank period VBP2 when the display panel 110 is driven at the second frequency FRQ2 different from the first frequency FRQ1. During the same time length, the number of times the pulses of the first and second scan signals S1 and S2 are applied to the pixel PX when the display panel 110 is driven at the first frequency FRQ1 (i.e., the number of times the light-emitting diode LED is turned off) may be different from the number of times the pulses of the first and second scan signals S1 and S2 are applied to the pixel PX when the display panel 110 is driven at the second frequency FRQ2. Accordingly, even if the display device according to the comparative example displays an image with the same grayscale, when the driving frequency DF of the display panel 110 changes, a luminance of the display panel 110 may change, and flicker may occur.

Figure 5:
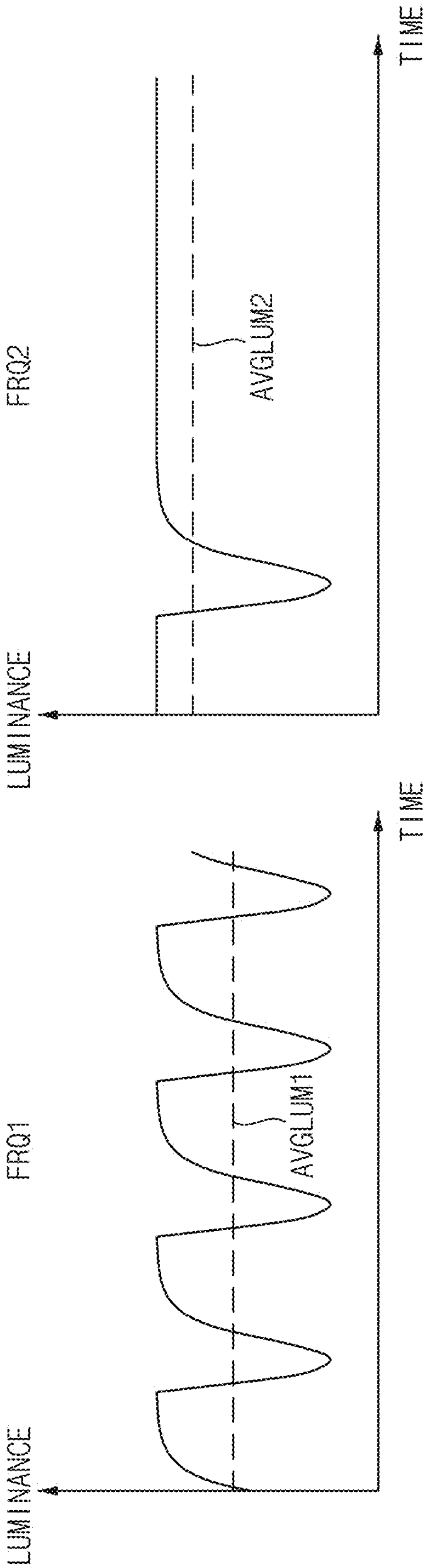
FIG. 5 is a timing diagram showing a luminance of a display device at first and second frequencies according to a comparative example.

FIG. 5 is a timing diagram showing a luminance of a display device at the first and second frequencies FRQ1 and FRQ2 according to the comparative example.

Referring to FIG. 5, in the display device according to the comparative example, during the same time length, the light-emitting diode LED of the display panel 110 driven at the first frequency FRQ1 (e.g., about 240 Hz) may be turned off about 4 times, and the light-emitting diode LED of the display panel 110 driven at the second frequency FRQ2 (e.g., about 60 Hz) may be turned off about once. Accordingly, an average luminance AVGLUM2 (e.g., 2.1 nits) of the display panel 110 driven at the second frequency FRQ2 may be higher than an average luminance AVGLUM1 (e.g., 1.6 nits) of the display panel 110 driven at the first frequency FRQ1.

Figure 6:
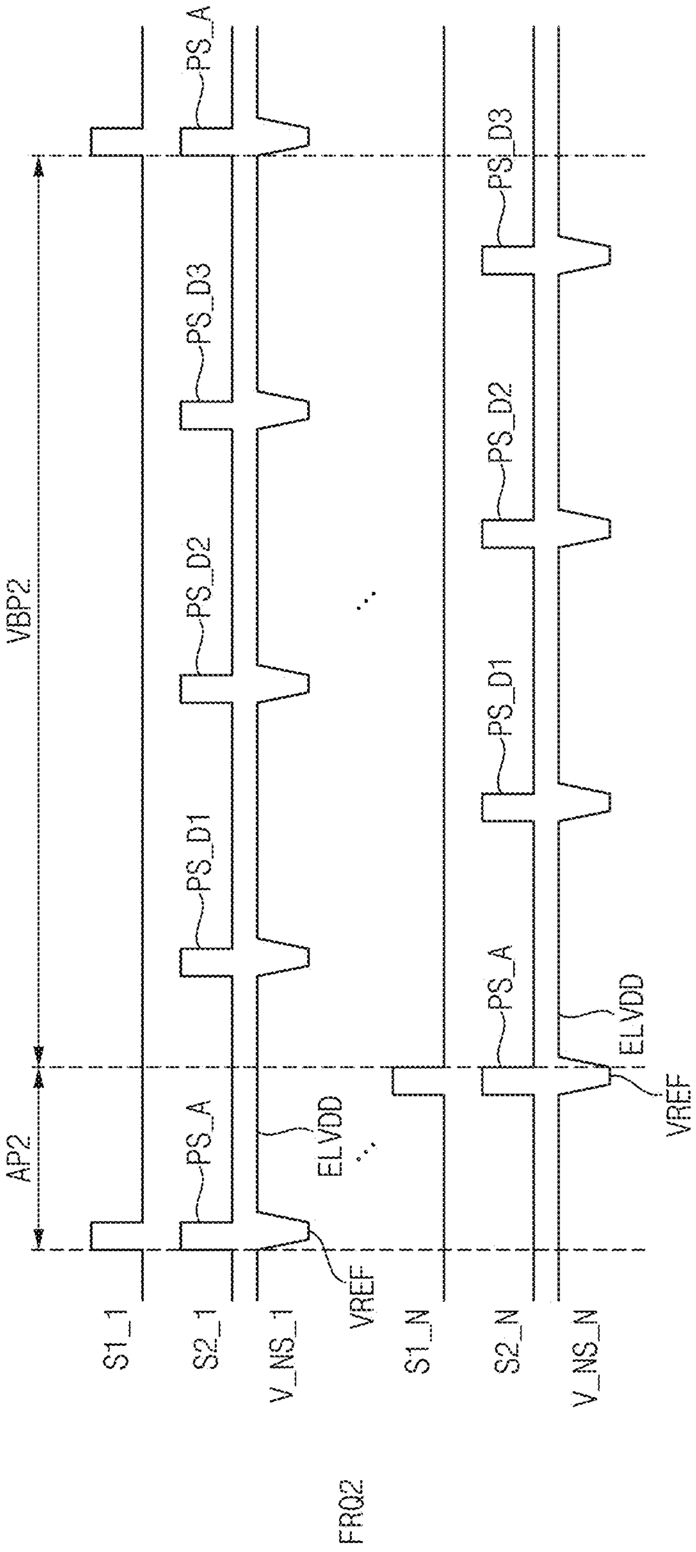
FIG. 6 is a diagram for describing an operation of a pixel at a second frequency according to a comparative example.

FIG. 6 is a diagram for describing an operation of a pixel PX in the second frequency FRQ2 according to a comparative example.

Referring to FIGS. 2 and 6, in order to prevent or reduce the luminance increase of the display panel 110 at a low frequency, in the display device according to the comparative example, the first scan signal S1 may be provided to the pixel PX at the driving frequency DF, and the second scan signal S2 may be provided to the pixel PX at a maximum driving frequency (e.g., the first frequency FRQ1). According to some embodiments, a driving in which the second scan signal S2 is provided to the pixel PX at the maximum driving frequency may be referred to as a dummy off driving.

As illustrated in FIG. 6, when the display panel 110 is driven at the second frequency FRQ2 lower than the first frequency FRQ1 that is the maximum driving frequency, pulses of the first scan signals S1_1, . . . , S1_N and active pulses PS_A of the second scan signals S2_1, . . . , S2_N may be sequentially provided to the pixels PX on a pixel row basis in the active period AP2, pulses of the first scan signals S1_1, . . . , S1_N may not be provided to the pixels PX in the vertical blank period VBP2, and dummy pulses PS_D1, PS_D2, and PS_D3 of the second scan signals S2_1, . . . , S2_N may be sequentially provided to the pixels PX on a pixel row basis at least once in the vertical blank period VBP2. For example, as illustrated in FIG. 6, when the display panel 110 is driven at the second frequency FRQ2, the dummy pulses PS_D1, PS_D2, and PS_D3 of the second scan signals S2_1, . . . , S2_N may be provided three times to the pixels PX in the vertical blank period VBP2. Accordingly, while the pulses of the first scan signals S1_1, . . . , S1_N are not applied to the pixel PX and the dummy pulses PS_D1, PS_D2, and PS_D3 of the second scan signals S2_1, . . . , S2_N are applied to the pixel PX in the vertical blank period VBP2, the third transistor T3 of the pixel PX may apply the reference voltage VREF to the second node NS, and the voltage V_NS_1, . . . , V_NS_N of the second node NS may change from the first power voltage ELVDD to the reference voltage VREF. The light-emitting diode LED of the pixel PX may not emit light due to the voltage V_NS_1, . . . , V_NS_N of the second node NS having the reference voltage VREF. Accordingly, the light-emitting diode LED may not emit light while the pulse of the first scan signal S1_1, . . . , S1_N and the active pulse PS_A of the second scan signal S2_1, . . . , S2_N are applied to the pixel PX in the active period AP2, and the light-emitting diode LED may not emit light while only the dummy pulses PS_D1, PS_D2, and PS_D3 of the second scan signal S2_1, . . . , S2_N are applied to the pixel PX.

Figure 7:
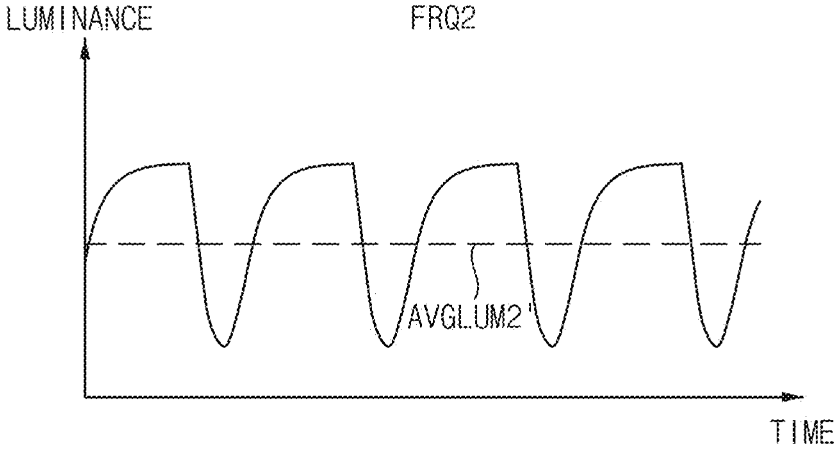
FIG. 7 is a timing diagram showing a luminance of a display device at a second frequency according to a comparative example.

FIG. 7 is a timing diagram showing a luminance of a display device in the second frequency FRQ2 according to the comparative example.

Referring to FIGS. 5 and 7, the number of times the light-emitting diode LED of the pixel PX is turned off when the display panel 110 is driven at the first frequency FRQ1 may be substantially the same as the number of times the light-emitting diode LED of the pixel PX is turned off when the display panel 110 is driven at the second frequency FRQ2. Accordingly, in the display device according to the comparative example, even if the driving frequency DF of the display panel 110 changes, the luminance of the display panel 110 may not substantially change, and the flicker may not occur. As illustrated in FIGS. 5 and 7, in the display device according to the comparative example, during the same time length, the light-emitting diode LED of the display panel 110 driven at the first frequency FRQ1 may be turned off about 4 times, and the light-emitting diode LED of the display panel 110 driven at the second frequency FRQ2 may also be turned off about 4 times. Accordingly, an average luminance AVGLUM2' (e.g., 1.6 nits) of the display panel 110 driven at the second frequency FRQ2 may be substantially equal to the average luminance AVGLUM1 (e.g., 1.6 nits) of the display panel 110 driven at the first frequency FRQ1.

Figure 8:
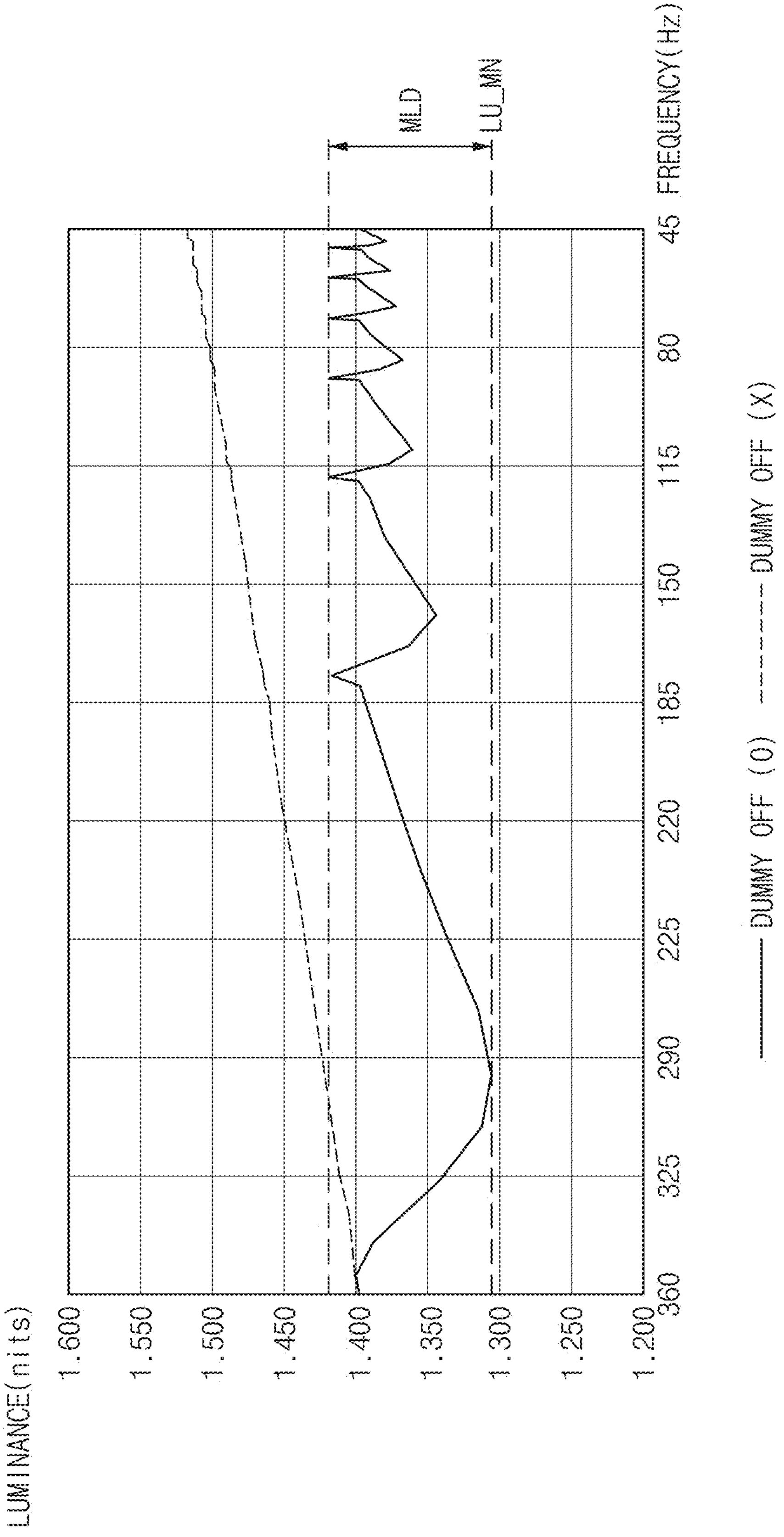
FIG. 8 is a graph showing a relationship between a frequency and a luminance of a display device according to a comparative example.

FIG. 8 is a graph showing a relationship between a frequency and a luminance of the display device according to the comparative example.

Referring to FIG. 8, when the display device does not use the dummy off driving, the luminance of the display device may increase as the frequency of the display device decreases. Accordingly, when the display device does not use the dummy off driving, the luminance of the display device may increase at a low frequency. When the display device uses the dummy off driving, the luminance of the display device may be prevented from increasing at the low frequency. However, when the display device uses the dummy off driving, the luminance of the display device may repeat periodic decreases and increases as the frequency of the display device decreases, and a maximum luminance deviation MLD between frequencies may rather increase. For example, when the frequency of the display device decreases from the maximum driving frequency (e.g., 360 Hz), the luminance of the display device may decrease up to a specific frequency (e.g., about 300 Hz), and because a length of a first decrease section is relatively large, a minimum luminance LU_MN may be relatively low. Accordingly, the maximum luminance deviation MLD between the frequencies may increase, and image quality of the display device may deteriorate.

Figure 9:
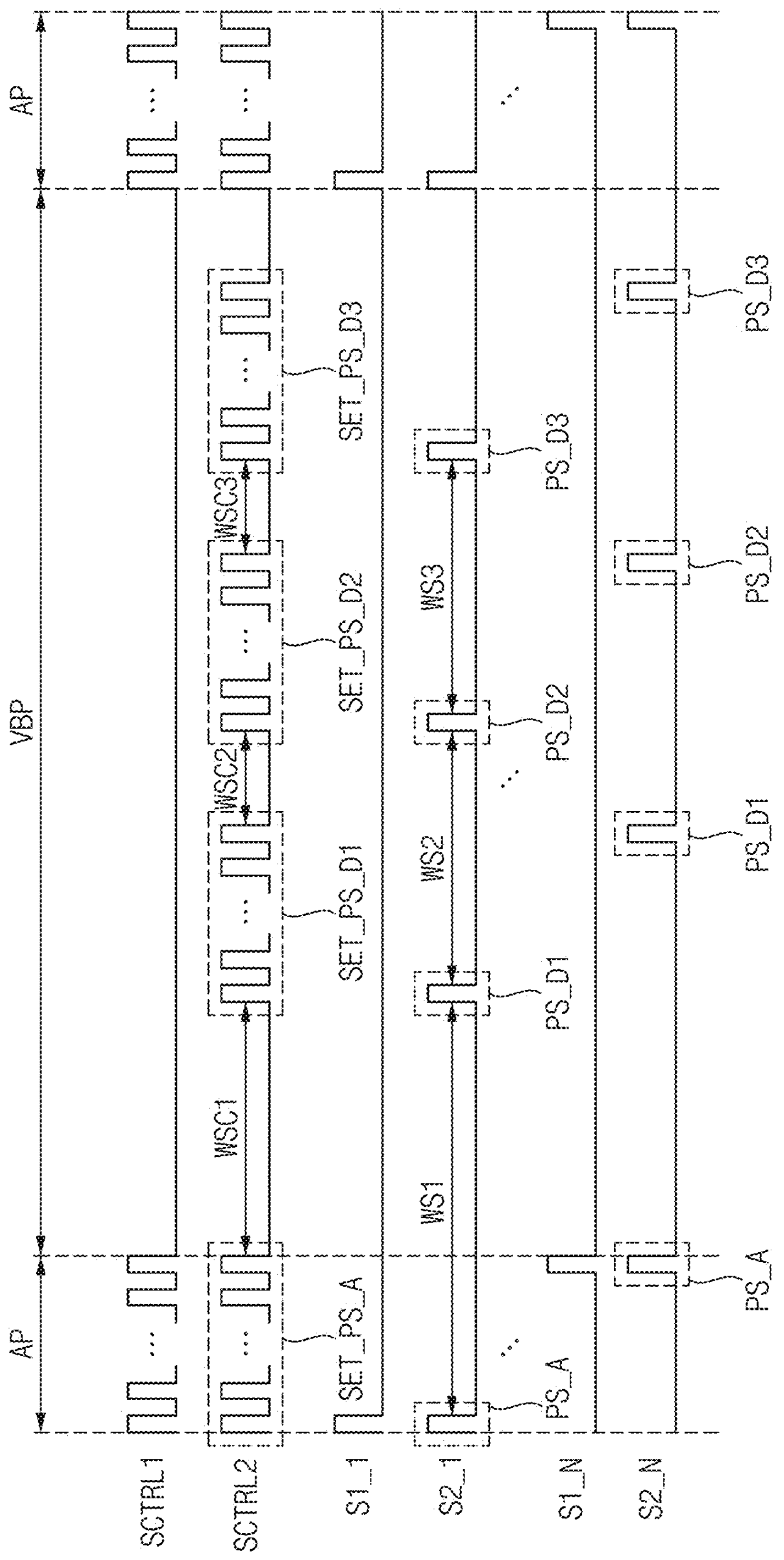
FIG. 9 is a timing diagram showing a first scan control signal, a second scan control signal, first scan signals, and second scan signals according to some embodiments.

FIG. 9 is a timing diagram showing the first scan control signal SCTRL1, the second scan control signal SCTRL2, the first scan signals S1_1, . . . , S1_N, and the second scan signals S2_1, . . . , S2_N according to some embodiments.

Referring to FIG. 9, in order to reduce the maximum luminance deviation between the frequencies, in the display device 100 according to some embodiments, an interval WS1 between an active pulse PS_A and a first dummy pulse PS_D1 of each of the second scan signals S2_1, . . . , S2_N may be different from an interval WS2 between the first dummy pulse PS_D1 and a second dummy pulse PS_D2 of each of the second scan signals S2_1, . . . , S2_N. Each of the second scan signals S2_1, . . . , S2_N may include the active pulse PS_A positioned in the active period AP and at least one dummy pulse PS_D1, PS_D2, and PS_D3 positioned in the vertical blank period VBP. FIG. 9 illustrates aspects of embodiments in which each of the second scan signals S2_1, . . . , S2_N includes three dummy pulses PS_D1, PS_D2, and PS_D3 positioned in the vertical blank period VBP, but the present disclosure is not limited thereto.

According to some embodiments, the interval WS1 between the active pulse PS_A and the first dummy pulse PS_D1 of each of the second scan signals S2_1, . . . , S2_N may be greater than the interval WS2 between the first dummy pulse PS_D1 and the second dummy pulse PS_D2 of each of the second scan signals S2_1, . . . , S2_N. The interval WS2 between the first dummy pulse PS_D1 and the second dummy pulse PS_D2 of each of the second scan signals S2_1, . . . , S2_N may be equal to an interval WS3 between the second dummy pulse PS_D2 and a third dummy pulse PS_D3 of each of the second scan signals S2_1, . . . , S2_N. In other words, an interval between an $m^{th}$ (m is a natural number greater than 1) dummy pulse and an $m+1^{th}$ dummy pulse of each of the second scan signals S2_1, . . . , S2_N may be equal to an interval between the $m+1^{th}$ dummy pulse and an $m+2^{th}$ dummy pulse of each of the second scan signals S2_1, . . . , S2_N, and the interval WS1 between the active pulse PS_A and the first dummy pulse PS_D1 of each of the second scan signals S2_1, . . . , S2_N may be greater than the interval between the $m^{th}$ dummy pulse and the $m+1^{th}$ dummy pulse of each of the second scan signals S2_1, . . . , S2_N.

Each of the first scan signals S1_1, . . . , S1_N may include a pulse positioned in the active period AP, and may have a deactivation level in the vertical blank period VBP.

The second scan control signal SCTRL2 may include an active pulse set SET_PS_A including a plurality of consecutive pulses positioned in the active period AP and at least one dummy pulse set SET_PS_D1, SET_PS_D2, and SET_PS_D3 including a plurality of consecutive pulses positioned in the vertical blank period VBP. FIG. 9 illustrates aspects of embodiments in which the second scan control signal SCTRL2 includes three dummy pulse sets SET_PS_D1, SET_PS_D2, and SET_PS_D3 positioned in the vertical blank period VBP, but the present disclosure is not limited thereto.

The active pulses PS_A of the second scan signals S2_1, . . . , S2_N may be sequentially generated in response to the consecutive pulses of the active pulse set SET_PS_A of the second scan control signal SCTRL2. For example, the active pulse PS_A of a first second scan signal S2_1 may be generated in response to a first pulse of the active pulse set SET_PS_A of the second scan control signal SCTRL2, and the active pulse PS_A of an $N^{th}$ second scan signal S2_N may be generated in response to an $N^{th}$ (last) pulse of the active pulse set SET_PS_A of the second scan control signal SCTRL2.

The dummy pulses PS_D1, PS_D2, and PS_D3 of the second scan signals S2_1, . . . , S2_N may be sequentially generated in response to the consecutive pulses of the dummy pulse set SET_PS_D1, SET_PS_D2, and SET_PS_D3 of the second scan control signal SCTRL2. For example, the first dummy pulse PS_D1 of a first second scan signal S2_1 may be generated in response to a first pulse of the first dummy pulse set SET_PS_D1 of the second scan control signal SCTRL2, and the first dummy pulse PS_D1 of an $N^{th}$ second scan signal S2_N may be generated in response to an $N^{th}$ (last) pulse of the first dummy pulse set SET_PS_D1 of the second scan control signal SCTRL2.

An interval WSC1 between the active pulse set SET_PS_A and the first dummy pulse set SET_PS_D1 of the second scan control signal SCTRL2 may be different from an interval WSC2 between the first dummy pulse set SET_PS_D1 and a second dummy pulse set SET_PS_D2 of the second scan control signal SCTRL2.

According to some embodiments, the interval WSC1 between the active pulse set SET_PS_A and the first dummy pulse set SET_PS_D1 of the second scan control signal SCTRL2 may be greater than the interval WSC2 between the first dummy pulse set SET_PS_D1 and the second dummy pulse set SET_PS_D2 of the second scan control signal SCTRL2. The interval WSC2 between the first dummy pulse set SET_PS_D1 and the second dummy pulse set SET_PS_D2 of the second scan control signal SCTRL2 may be equal to an interval WSC3 between the second dummy pulse set SET_PS_D2 and a third dummy pulse set SET_PS_D3 of the second scan control signal SCTRL2. In other words, an interval between an $m^{th}$ dummy pulse set and an $m+1^{th}$ dummy pulse set of the second scan control signal SCTRL2 may be equal to an interval between the $m+1^{th}$ dummy pulse set and an $m+2^{th}$ dummy pulse set of the second scan control signal SCTRL2, and the interval WSC1 between the active pulse set SET_PS_A and the first dummy pulse set SET_PS_D1 of the second scan control signal SCTRL2 may be greater than the interval between the $m^{th}$ dummy pulse set and the $m+1^{th}$ dummy pulse set of the second scan control signal SCTRL2.

The first scan control signal SCTRL1 may include a pulse set including a plurality of consecutive pulses positioned in the active period AP, and may have a deactivation level in the vertical blank period VBP.

The pulses of the first scan signals S1_1, . . . , S1_N may be sequentially generated in response to the consecutive pulses of the pulse set of the first scan control signal SCTRL1. For example, the pulse of a first first scan signal S1_1 may be generated in response to a first pulse of the pulse set of the first scan control signal SCTRL1, and the pulse of an $N^{th}$ first scan signal S1_N may be generated in response to an $N^{th}$ (last) pulse of the pulse set of the first scan control signal SCTRL1.

Figure 10:
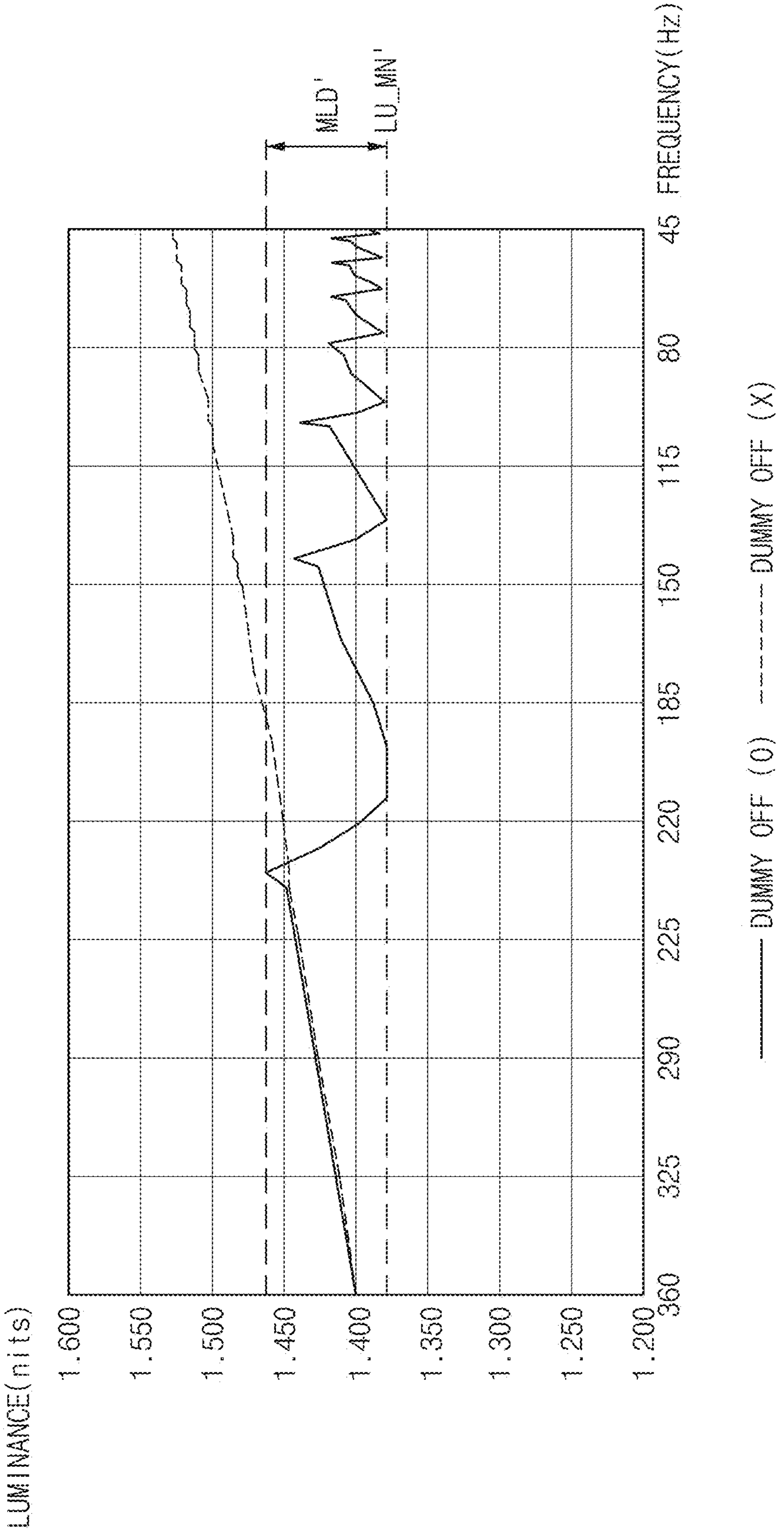
FIG. 10 is a graph showing a relationship between a frequency and a luminance of a display device according to some embodiments.

FIG. 10 is a graph showing a relationship between a frequency and a luminance of the display device 100 according to some embodiments.

Referring to FIGS. 8 to 10, in the display device 100 according to some embodiments, the interval WS1 between the active pulse PS_A and the first dummy pulse PS_D1 of each of the second scan signals S2_1, . . . , S2_N may be greater than the interval WS2 between the first dummy pulse PS_D1 and the second dummy pulse PS_D2 of each of the second scan signals S2_1, . . . , S2_N (the interval WSC1 between the active pulse set SET_PS_A and the first dummy pulse set SET_PS_D1 of the second scan control signal SCTRL2 may be greater than the interval WSC2 between the first dummy pulse set SET_PS_D1 and the second dummy pulse set SET_PS_D2 of the second scan control signal SCTRL2), and accordingly, a maximum luminance deviation MLD' between the frequencies when the dummy off driving according to some embodiments is used may be less than the maximum luminance deviation MLD between the frequencies when the dummy off driving according to the comparative example is used. For example, when the frequency of the display device decreases from the maximum driving frequency (e.g., 360 Hz), the luminance of the display device may increase up to a specific frequency (e.g., about 240 Hz), and because a length of a first decrease section is relatively small, a minimum luminance LU_MN' may be relatively high. Accordingly, the maximum luminance deviation MLD' between the frequencies may be reduced, and the image quality of the display device 100 may be relatively improved.

Figure 11:
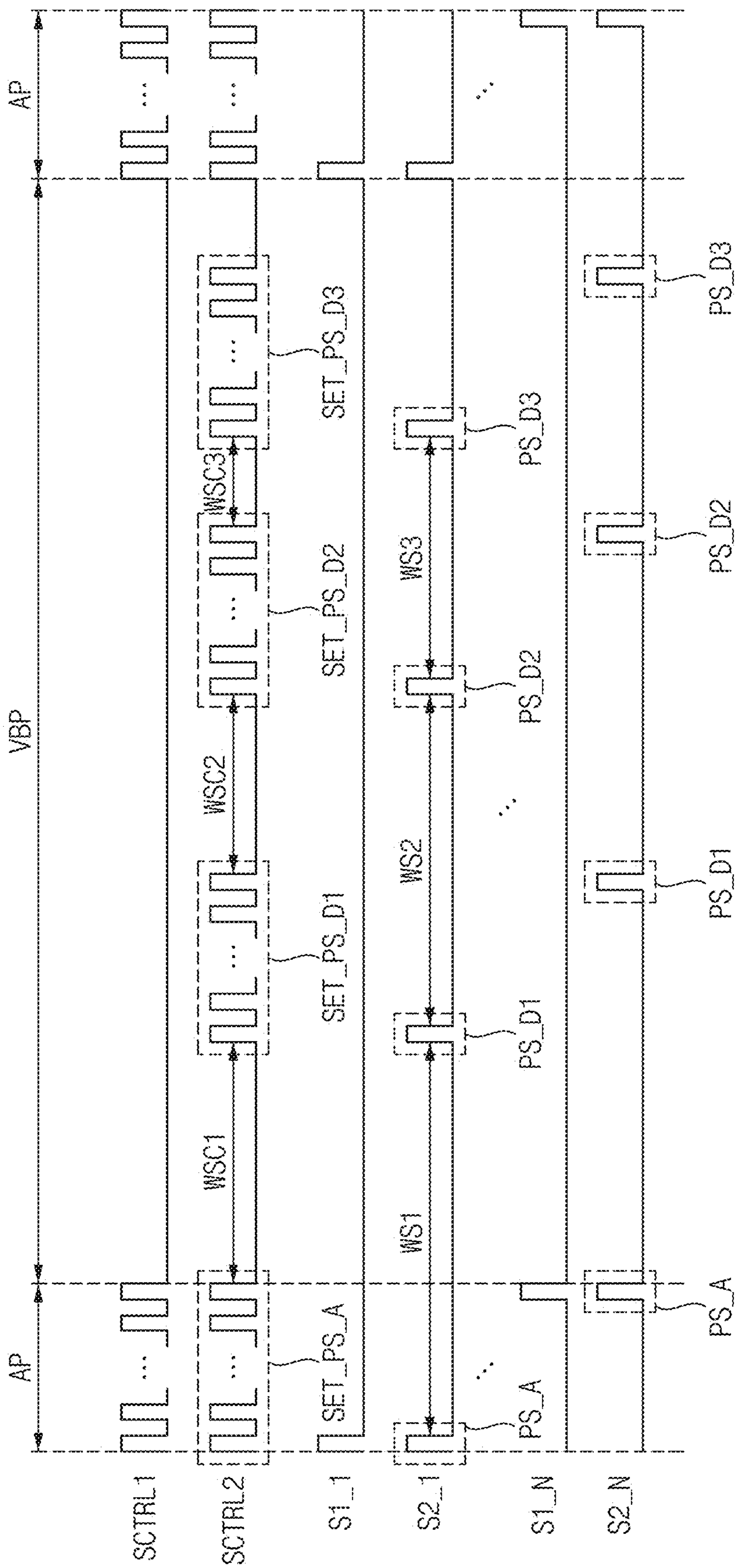
FIG. 11 is a timing diagram showing a first scan control signal, a second scan control signal, a first scan signals, and a second scan signals according to some embodiments.

FIG. 11 is a timing diagram showing the first scan control signal SCTRL1, the second scan control signal SCTRL2, the first scan signals S1_1, . . . , S1_N, and the second scan signals S2_1, . . . , S2_N according to some embodiments.

Description of the first scan control signal SCTRL1, the second scan control signal SCTRL2, the first scan signals S1_1, . . . , S1_N, and the second scan signals S2_1, . . . , S2_N described with reference to FIG. 11, which are overlapped with the description of the first scan control signal SCTRL1, the second scan control signal SCTRL2, the first scan signals S1_1, . . . , S1_N, and the second scan signals S2_1, . . . , S2_N described with reference to FIG. 9, is omitted.

Referring to FIG. 11, the interval WS2 between the first dummy pulse PS_D1 and the second dummy pulse PS_D2 of each of the second scan signals S2_1, . . . , S2_N may be different from the interval WS3 between the second dummy pulse PS_D2 and the third dummy pulse PS_D3 of each of the second scan signals S2_1, . . . , S2_N.

According to some embodiments, the interval WS1 between the active pulse PS_A and the first dummy pulse PS_D1 of each of the second scan signals S2_1, . . . , S2_N may be greater than the interval WS2 between the first dummy pulse PS_D1 and the second dummy pulse PS_D2 of each of the second scan signals S2_1, . . . , S2_N, and the interval WS2 between the first dummy pulse PS_D1 and the second dummy pulse PS_D2 of each of the second scan signals S2_1, . . . , S2_N may be greater than the interval WS3 between the second dummy pulse PS_D2 and the third dummy pulse PS_D3 of each of the second scan signals S2_1, . . . , S2_N.

The active pulses PS_A of the second scan signals S2_1, . . . , S2_N may be sequentially generated in response to the consecutive pulses of the active pulse set SET_PS_A of the second scan control signal SCTRL2. The dummy pulses PS_D1, PS_D2, and PS_D3 of the second scan signals S2_1, . . . , S2_N may be sequentially generated in response to the consecutive pulses of the dummy pulse set SET_PS_D1, SET_PS_D2, and SET_PS_D3 of the second scan control signal SCTRL2.

The interval WSC2 between the first dummy pulse set SET_PS_D1 and the second dummy pulse set SET_PS_D2 of the second scan control signal SCTRL2 may be different from the interval WSC3 between the second dummy pulse set SET_PS_D2 and the third dummy pulse set SET_PS_D3 of the second scan control signal SCTRL2.

According to some embodiments, the interval WSC1 between the active pulse set SET_PS_A and the first dummy pulse set SET_PS_D1 of the second scan control signal SCTRL2 may be greater than the interval WSC2 between the first dummy pulse set SET_PS_D1 and the second dummy pulse set SET_PS_D2 of the second scan control signal SCTRL2, and the interval WSC2 between the first dummy pulse set SET_PS_D1 and the second dummy pulse set SET_PS_D2 of the second scan control signal SCTRL2 may be greater than the interval WSC3 between the second dummy pulse set SET_PS_D2 and the third dummy pulse set SET_PS_D3 of the second scan control signal SCTRL2.

Figure 12:
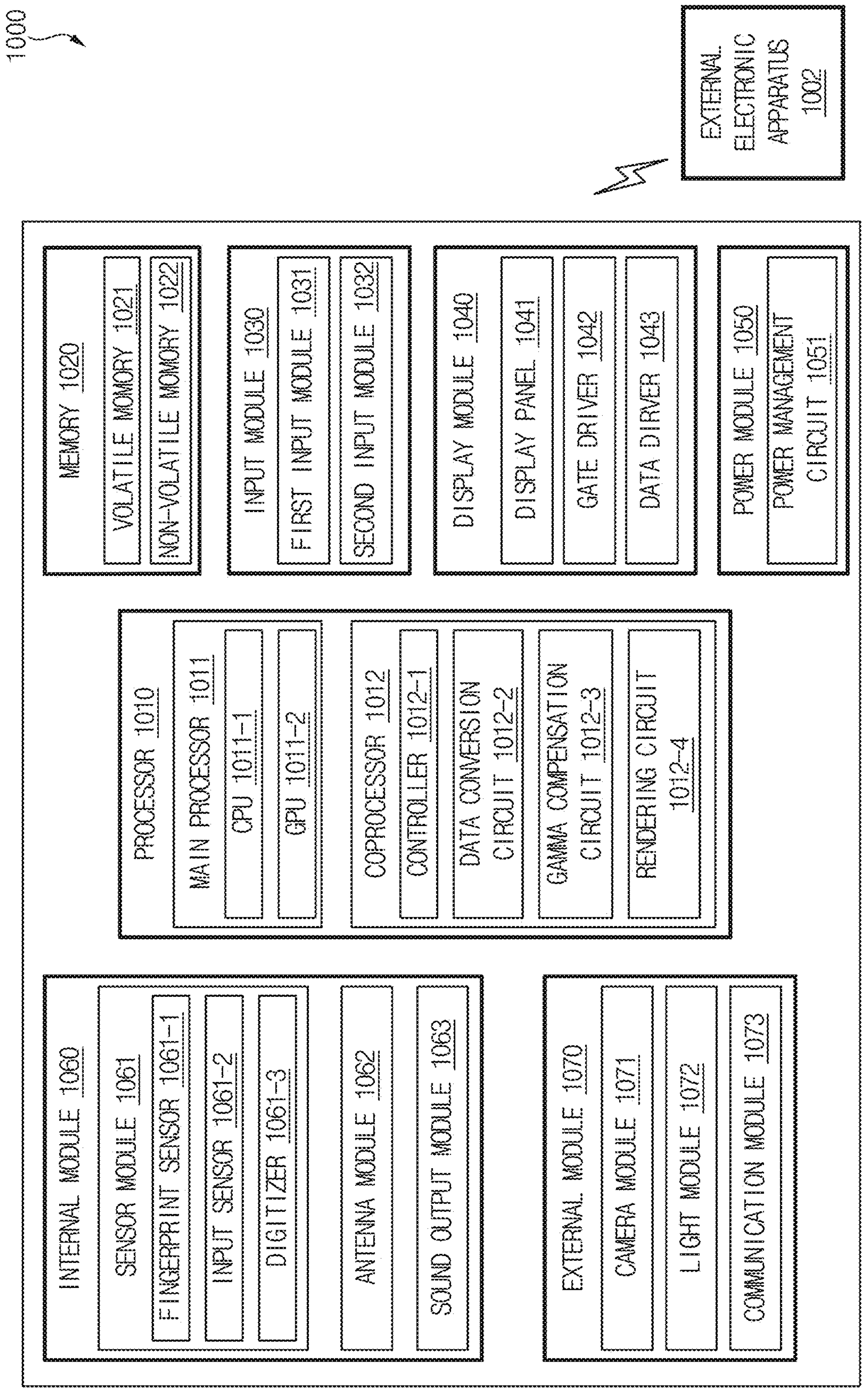
FIG. 12 is a block diagram showing an electronic apparatus according to some embodiments.
Figure 13:
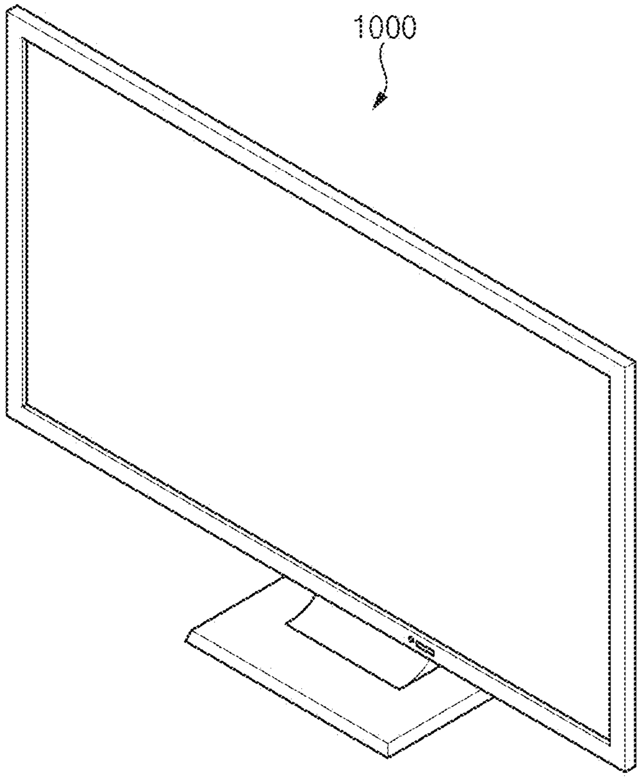
FIG. 13 is a diagram showing an example in which the electronic apparatus of FIG. 12 is implemented as a computer monitor.

FIG. 12 is a block diagram showing an electronic apparatus 1000 according to some embodiments. FIG. 13 is a diagram showing an example in which the electronic apparatus 1000 of FIG. 12 is implemented as a computer monitor.

Referring to FIGS. 12 and 13, the electronic apparatus 1000 may output various information through a display module 1040 within operating system. When a processor 1010 executes an application stored in a memory 1020, the display module 1040 may provide application information to a user through a display panel 1041. According to some embodiments, the processor 1010 may provide the input image data IDAT of FIG. 1 and the control signal CTRL of FIG. 1 to the display module 1040.

The processor 1010 may obtain an external input through an input module 1030 or a sensor module 1061, and may execute an application corresponding to the external input. For example, when the user selects a camera icon displayed on the display panel 1041, the processor 1010 may obtain a user input through an input sensor 1061-2, and may activate a camera module 1071. The processor 1010 may transmit image data corresponding to a captured image acquired through the camera module 1071 to the display module 1040. The display module 1040 may display an image corresponding to the captured image through the display panel 1041. Some of components of the electronic apparatus 1000 may be integrated and provided as one component, or one component may be provided separately into two or more components.

The electronic apparatus 1000 may communicate with an external electronic apparatus 1002 through a network (e.g., a short-range wireless communication network or a long-range wireless communication network). According to some embodiments, the electronic apparatus 1000 may include the processor 1010, the memory 1020, the input module 1030, the display module 1040, a power module 1050, an internal module 1060, and an external module 1070. According to some embodiments, the electronic apparatus 1000 may omit at least one of the above-described components, or one or more other components may be added. According to some embodiments, some of the above-described components (e.g., a sensor module 1061, an antenna module 1062, or a sound output module 1063) may be integrated into another component (e.g., the display module 1040).

The processor 1010 may execute software to control at least one other component (e.g., hardware or software component) of the electronic apparatus 1000 connected to the processor 1010, and may perform various data processing or calculation. According to some embodiments, as at least part of data processing or calculation, the processor 1010 may store commands or data received from another component (e.g., the input module 1030, the sensor module 1061, or a communication module 1073) in a volatile memory 1021, may process the commands or data stored in the volatile memory 1021, and may store resultant data in a non-volatile memory 1022.

The processor 1010 may include a main processor 1011 and a coprocessor 1012. The main processor 1011 may include one or more of a central processing unit (CPU) 1011-1 or an application processor (AP). The main processor 1011 may further include one or more of a graphics processing unit (GPU) 1011-2, a communication processor (CP), and an image signal processor (ISP). At least two of the above-described processing unit and processor may be implemented as an integrated component (e.g., a single chip), or each may be implemented as an independent component (e.g., a plurality of chips).

The coprocessor 1012 may include a controller 1012-1. The controller 1012-1 may include an interface conversion circuit and a timing control circuit. The controller 1012-1 may receive an image signal from the main processor 1011, may convert data format of the image signal to suit the interface specifications with the display module 1040, and may output image data. The controller 1012-1 may output various control signals necessary for driving the display module 1040.

The coprocessor 1012 may further include a data conversion circuit 1012-2, a gamma correction circuit 1012-3, a rendering circuit 1012-4, etc. The data conversion circuit 1012-2 may receive the image data from the controller 1012-1, and may compensate the image data such that the image is displayed at a desired luminance according to the characteristics of the electronic apparatus 1000 or the user's settings or may convert the image data to reduce power consumption or compensate for afterimages. The gamma correction circuit 1012-3 may convert the image data or a gamma reference voltage such that an image displayed on the electronic apparatus 1000 has desired gamma characteristics. The rendering circuit 1012-4 may receive the image data from the controller 1012-1, and may render the image data by considering a pixel arrangement of the display panel 1041 applied to the electronic apparatus 1000. At least one of the data conversion circuit 1012-2, the gamma correction circuit 1012-3, and the rendering circuit 1012-4 may be integrated into another component (e.g., the main processor 1011 or a controller). At least one of the data conversion circuit 1012-2, the gamma correction circuit 1012-3, and the rendering circuit 1012-4 may be integrated into a data driver 1043 to be described below.

The memory 1020 may store various data used by at least one component of the electronic apparatus 1000 (e.g., the processor 1010 or the sensor module 1061) and input data or output data for commands related thereto. The memory 1020 may include at least one of the volatile memory 1021 and the non-volatile memory 1022.

The input module 1030 may receive commands or data to be used in components of the electronic apparatus 1000 (e.g., the processor 1010, the sensor module 1061, or the sound output module 1063) from the outside of the electronic apparatus 1000 (e.g., the user or the external electronic apparatus 1002).

The input module 1030 may include a first input module 1031 through which commands or data are input from the user, and a second input module 1032 through which command or data are input from the external electronic apparatus 1002. The first input module 1031 may include a microphone, a mouse, a keyboard, a key (e.g., button), or a pen (e.g., passive pen or active pen). The second input module 1032 may support a designated protocol that may connect to the external electronic apparatus 1002 by wire or wirelessly. According to some embodiments, the second input module 1032 may include a high definition multimedia interface (HDMI), a universal serial bus (USB) interface, an SD card interface, or an audio interface. The second input module 1032 may include a connector that may be physically connected to the external electronic apparatus 1002, for example, an HDMI connector, a USB connector, an SD card connector, or an audio connector (e.g., a headphone connector).

The display module 1040 may provide visual information to the user. The display module 1040 may include the display panel 1041, a gate driver 1042, and the data driver 1043. The display module 1040 may further include a window, a chassis, and a bracket to protect the display panel 1041. The display module 1040 may correspond to the display device 100 of FIG. 1. The display panel 1041, the gate driver 1042, and the data driver 1043 may correspond to the display panel 110, the scan driver 130, and the data driver 120 of FIG. 1, respectively.

The power module 1050 may supply power to components of the electronic apparatus 1000. The power module 1050 may include a battery that charges power voltage. The battery may include a non-rechargeable primary cell, a rechargeable secondary cell, or a fuel cell. The power module 1050 may include a power management circuit 1051. The power management circuit 1051 may supply optimized power to each of the above-described modules and the modules described below. The power module 1050 may include a wireless power transmission/reception member electrically connected to the battery. The wireless power transmission/reception member may include a plurality of coil-shaped antenna radiators.

The electronic apparatus 1000 may further include the internal module 1060 and the external module 1070. The internal module 1060 may include the sensor module 1061, the antenna module 1062, and the sound output module 1063. The external module 1070 may include the camera module 1071, a light module 1072, and a communication module 1073.

The sensor module 1061 may detect an input by the user's body or an input by the pen among the first input module 1031, and may generate an electrical signal or a data value corresponding to the input. The sensor module 1061 may include at least one of a fingerprint sensor 1061-1, an input sensor 1061-2, and a digitizer 1061-3.

The processor 1010 may output commands or data to the display module 1040, the sound output module 1063, the camera module 1071, or the light module 1072 based on the input data received from the input module 1030. For example, the processor 1010 may generate image data in response to input data applied through the mouse or the active pen and output the image data to the display module 1040, or may generate command data in response to the input data to output the command data to the camera module 1071 or the light module 1072. When no input data is received from the input module 1030 for a certain period of time, the processor 1010 may switch an operation mode of the electronic apparatus 1000 to a low-power mode or a sleep mode to reduce power consumption of the electronic apparatus 1000.

The processor 1010 may output commands or data to the display module 1040, the sound output module 1063, the camera module 1071, or the light module 1072 based on sensing data received from the sensor module 1061. For example, the processor 1010 may compare authentication data authorized by the fingerprint sensor 1061-1 with authentication data stored in the memory 1020, and then may execute an application according to the comparison result. The processor 1010 may execute command or output corresponding image data to the display module 1040 based on sensing data detected by the input sensor 1061-2 or the digitizer 1061-3. When the sensor module 1061 includes a temperature sensor, the processor 1010 may receive temperature data for a temperature measured from the sensor module 1061, and may further perform luminance correction for the image data or the like based on the temperature data.

According to some embodiments, as illustrated in FIG. 13, the electronic apparatus 1000 may be implemented as a computer monitor. However, the present disclosure is not limited thereto, and according to some embodiments, the electronic apparatus 1000 may be implemented as a television, a mobile phone, a video phone, a smart pad, a smart watch, a tablet PC, a vehicle navigation, a laptop, a head mounted display device, an artificial reality (AR) apparatus, etc.

The display device according to the embodiments may be applied to a display device included in a computer, a notebook, a mobile phone, a smart phone, a smart pad, a smart watch, a PMP, a PDA, an MP3 player, or the like.

Although the display device and the electronic apparatus according to the embodiments have been described with reference to the drawings, the illustrated embodiments are examples, and may be modified and changed by a person having ordinary knowledge in the relevant technical field without departing from the technical spirit described in the appended claims, and their equivalents.

What is claimed is:

1. A display device comprising:
- a display panel including a pixel;
- a scan driver configured to provide a first scan signal and a second scan signal to the pixel; and
- a controller configured to provide a first scan control signal for generating the first scan signal and a second scan control signal for generating the second scan signal to the scan driver,
- wherein the second scan signal includes an active pulse in an active period having a constant time length and at least one dummy pulse in a vertical blank period having a variable time length, and
- wherein an interval between the active pulse and a first dummy pulse of the second scan signal is different from an interval between the first dummy pulse and a second dummy pulse of the second scan signal.

2. The display device of claim 1, wherein the interval between the first dummy pulse and the second dummy pulse of the second scan signal is equal to an interval between the second dummy pulse and a third dummy pulse of the second scan signal.

3. The display device of claim 2, wherein the interval between the active pulse and the first dummy pulse of the second scan signal is greater than the interval between the first dummy pulse and the second dummy pulse of the second scan signal.

4. The display device of claim 1, wherein the interval between the first dummy pulse and the second dummy pulse of the second scan signal is different from an interval between the second dummy pulse and a third dummy pulse of the second scan signal.

5. The display device of claim 4, wherein the interval between the active pulse and the first dummy pulse of the second scan signal is greater than the interval between the first dummy pulse and the second dummy pulse of the second scan signal.

6. The display device of claim 5, wherein the interval between the first dummy pulse and the second dummy pulse of the second scan signal is greater than the interval between the second dummy pulse and the third dummy pulse of the second scan signal.

7. The display device of claim 1, wherein the pixel includes:

a first transistor including a gate connected to a first node, a first terminal configured to receive a first power voltage, and a second terminal connected to a second node;

a second transistor including a gate configured to receive the first scan signal, a first terminal configured to receive a data voltage, and a second terminal connected to the first node;

a third transistor including a gate configured to receive the second scan signal, a first terminal configured to receive a reference voltage, and a second terminal connected to the second node;

a capacitor including a first terminal connected to the first node and a second terminal connected to the second node; and a light-emitting diode including a first terminal connected to the second node and a second terminal configured to receive a second power voltage.

8. The display device of claim 7, wherein the capacitor is configured to store a difference between the data voltage and the reference voltage in response to a pulse of the first scan signal and the active pulse of the second scan signal in the active period, and wherein the reference voltage is applied to the second node in response to the at least one dummy pulse of the second scan signal in the vertical blank period.

9. The display device of claim 8, wherein a voltage level of the reference voltage is lower than a voltage level of a threshold voltage of the light-emitting diode.

10. The display device of claim 1, wherein the first scan signal includes a pulse in the active period, and has a deactivation level in the vertical blank period.

11. A display device comprising:

a display panel including a pixel;

a scan driver configured to provide a first scan signal and a second scan signal to the pixel; and a controller configured to provide a first scan control signal for generating the first scan signal and a second scan control signal for generating the second scan signal to the scan driver, wherein the second scan control signal includes an active pulse set including a plurality of consecutive pulses in an active period having a constant time length and at least one dummy pulse set including a plurality of consecutive pulses in a vertical blank period having a variable time length, and wherein an interval between the active pulse set and a first dummy pulse set of the second scan control signal is different from an interval between the first dummy pulse set and a second dummy pulse set of the second scan control signal.

12. The display device of claim 11, wherein the interval between the first dummy pulse set and the second dummy pulse set of the second scan control signal is equal to an interval between the second dummy pulse set and a third dummy pulse set of the second scan control signal.

13. The display device of claim 12, wherein the interval between the active pulse set and the first dummy pulse set of the second scan control signal is greater than the interval between the first dummy pulse set and the second dummy pulse set of the second scan control signal.

14. The display device of claim 11, wherein the interval between the first dummy pulse set and the second dummy pulse set of the second scan control signal is different from an interval between the second dummy pulse set and a third dummy pulse set of the second scan control signal.

15. The display device of claim 14, wherein the interval between the active pulse set and the first dummy pulse set of the second scan control signal is greater than the interval between the first dummy pulse set and the second dummy pulse set of the second scan control signal.

16. The display device of claim 15, wherein the interval between the first dummy pulse set and the second dummy pulse set of the second scan control signal is greater than the interval between the second dummy pulse set and the third dummy pulse set of the second scan control signal.

17. The display device of claim 11, wherein the pixel includes:

a first transistor including a gate connected to a first node, a first terminal configured to receive a first power voltage, and a second terminal connected to a second node;

a second transistor including a gate configured to receive the first scan signal, a first terminal configured to receive a data voltage, and a second terminal connected to the first node;

a third transistor including a gate configured to receive the second scan signal, a first terminal configured to receive a reference voltage, and a second terminal connected to the second node;

a capacitor including a first terminal connected to the first node and a second terminal connected to the second node; and a light-emitting diode including a first terminal connected to the second node and a second terminal configured to receive a second power voltage.

18. The display device of claim 11, wherein the first scan control signal includes a pulse set including a plurality of consecutive pulses in the active period, and has a deactivation level in the vertical blank period.

19. An electronic apparatus comprising:

a display panel including a pixel;

a scan driver configured to provide a first scan signal and a second scan signal to the pixel;

a controller configured to provide a first scan control signal for generating the first scan signal and a second scan control signal for generating the second scan signal to the scan driver; and a processor configured to provide a control signal for generating the first scan control signal and the second scan control signal to the controller, wherein the second scan signal includes an active pulse in an active period having a constant time length and at least one dummy pulse in a vertical blank period having a variable time length, and wherein an interval between the active pulse and a first dummy pulse of the second scan signal is different from an interval between the first dummy pulse and a second dummy pulse of the second scan signal.

20. The electronic apparatus of claim 19, wherein the interval between the active pulse and the first dummy pulse of the second scan signal is greater than the interval between the first dummy pulse and the second dummy pulse of the second scan signal.

* * * * *